United States Patent Office 3,262,150
Patented July 26, 1966

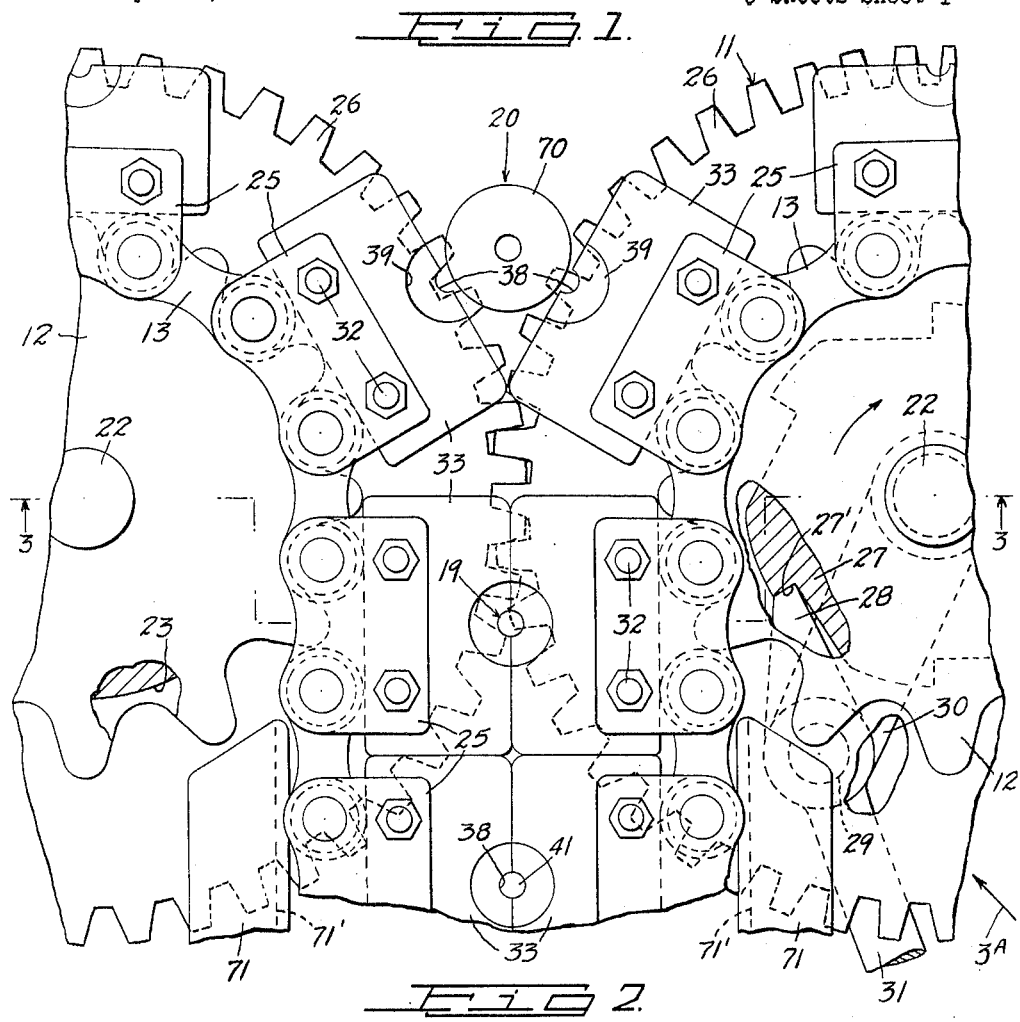
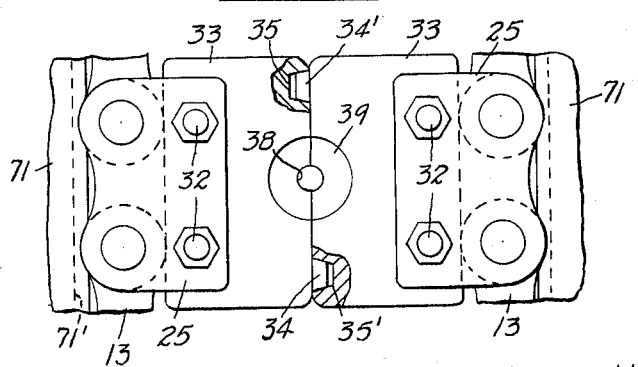

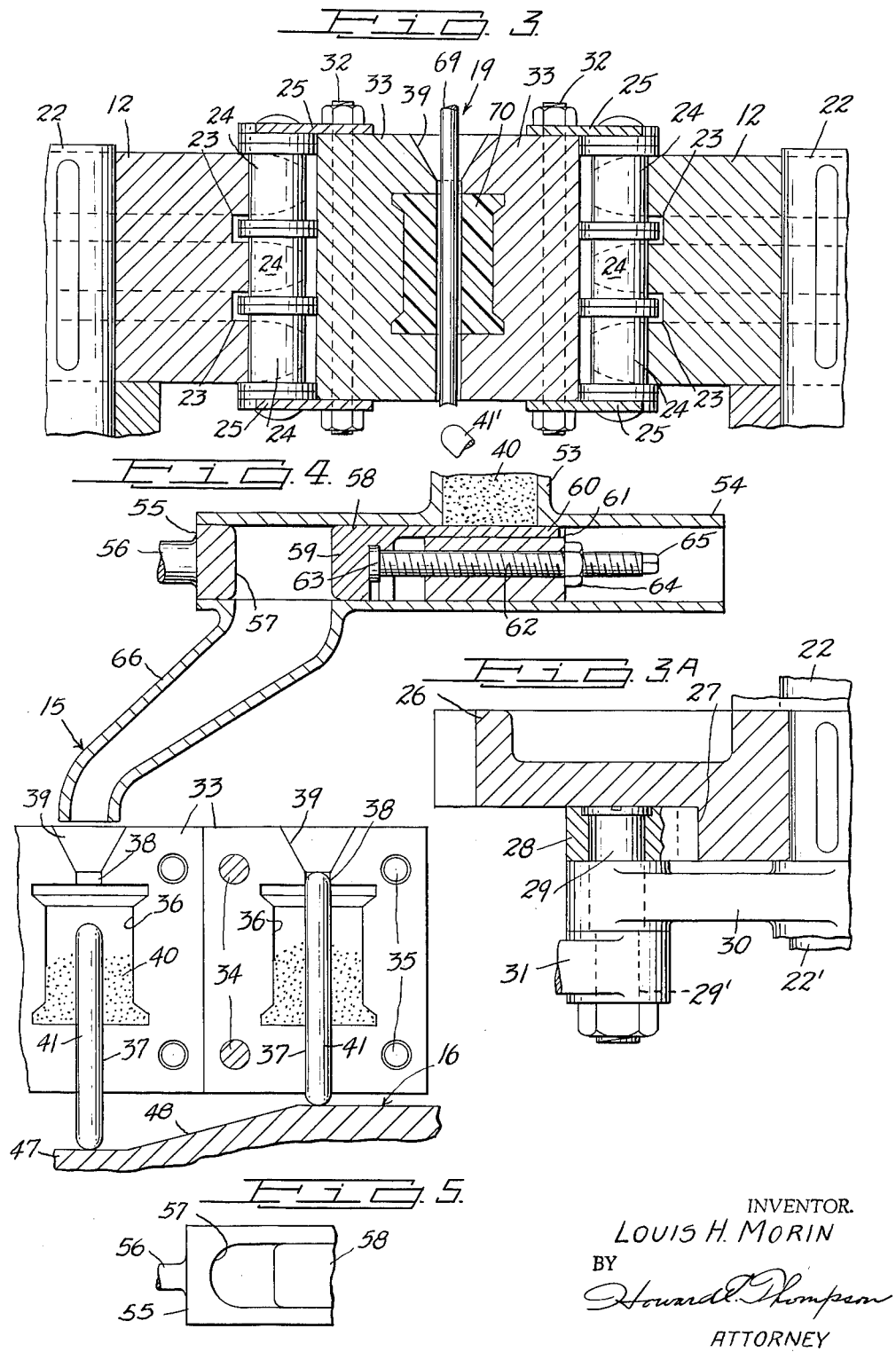

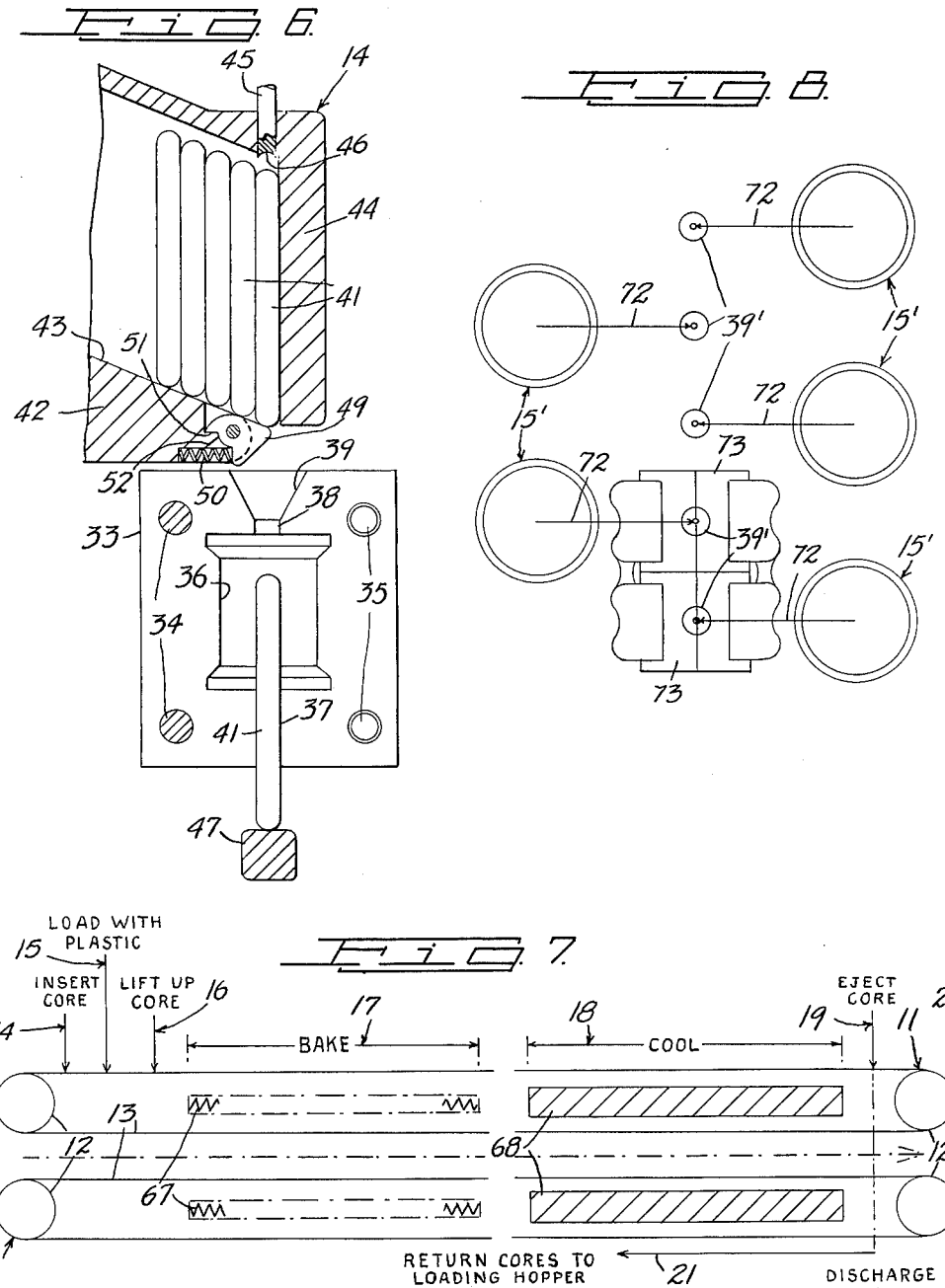

3,262,150
MACHINE FOR PRODUCING FOAMED PLASTIC
SPOOLS AT HIGH SPEED
Louis H. Morin, Bronx, N.Y., assignor to Coats & Clark
Inc., New York, N.Y., a corporation of Delaware
Filed Sept. 14, 1964, Ser. No. 396,264
5 Claims. (Cl. 18—4)

This invention relates to machines for producing plastic spools at high speed from foamable plastic. More particularly, the invention deals in a machine employing a pair of endless chains, adjacent links of which are joined by die part supporting plates, with means arranged between sprocket ends of said pair of chains for maintaining die halves of the pair of chains in abutting engagement with each other throughout the entire operation of insertion of the plastic material, actuation of cores, the heating or baking stage, the cooling stage and the core ejector stage, preparatory to discharging the finished foamed plastic spool end product, as well as in the return of the ejected cores to a loading hopper.

Still more particularly, the invention deals with a machine of the character described which facilitates the interchange of dies for forming spools of different sizes or contours, as well as in the provision of adjustable means to control the quantity of plastic crystals delivered to the dies, consistent with the size of the cavity in the dies which are employed.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is partial schematic view of the discharge end of a machine made according to my invention, with parts of the construction broken away and in section and omitting structural details illustrated in FIG. 2 of the drawing.

FIG. 2 is a detail view of two of the chains and dies when supported in abutting relationship to each other and illustrating, in section, the means for maintaining the die halves in perfect alinement, which structure has been omitted from the illustration in FIG. 1 to simplify the showing in FIG. 1.

FIG. 3 is a section on the broken line 3—3 of FIG. 1 showing the core ejector station in illustrating, in part, the removal of a core.

FIG. 3A is a sectional and elevational view looking generally in the direction of the arrow 3A of FIG. 1 to illustrate the pawl and ratchet drive in transmitting the intermittent feed defining each increment cycle of operation.

FIG. 4 is a diagrammatic sectional view taken along the parting line of the dies in illustrating the means for discharge of a predetermined measured amount of the plastic crystals to the die cavity, as well as actuation of the core pins at the core insertion and core lift-up stations of the machine, parts of the construction being shown in elevation.

FIG. 5 is a detached detailed view of the plastic crystal delivery slide illustrating part of the adjustable element of the slide.

FIG. 6 is a diagrammatic view, generally similar to FIG. 4, showing the core pin inserting station, part of the construction being shown in section.

FIG. 7 is a diagrammatic view illustrating the two driven chains and relative location of the various stations with respect to the chains to simplify the understanding of complete operation of the machine; and FIG. 8 is a schematic view roughly outlining two complete die units and diagrammatically illustrating an increment equivalent to five pairs of dies in each cycle of operation of the machine, rather than the feed of each pair of dies, as illustrated in FIG. 1 of the drawing.

In order to obtain a general picture of the machine and its operation, reference is first made to FIG. 7 of the drawing, in which figure 10 would indicate the delivery end of the machine and 11 the discharge end. Both ends of the machine have similar pairs of similar sprockets 12, over which are passed endless chains 13 illustrated in FIG. 7 by the lines extending between the spaced sprockets. At 14 is indicated the core inserting station, 15 the plastic loading station, 16 the core lifting station, 17 the heating or baking station, 18 the cooling station, 19 the core ejector station, 20 the finished spool discharge station and at 21 the means for return of cores to a loading hopper for re-delivery of cores to the inserting station 14.

At this time, it is pointed out that the length of the stations 17 and 18 and the chains 13 will depend largely upon the speed at which the machine is operated. This spacing naturally positions the ends 10 and 11 at different distances with respect to each other. It is possible to produce spools at the rate of five hundred per minute.

Turning now to the showing in FIG. 1 of the drawing, in this figure, the sprockets 12 at the discharge end 11 of the machine are shown in part, as well as the chains 13 engaging the sprockets. The sprockets are mounted on shafts 22 and, considering FIG. 3, it will appear that each of the sprockets are divided by grooves 23 into three tooth sections and each of the chains have three roller portions 24 engaging these teeth, it being apparent that part of the link portions of the multiple roller chains operate in the grooves 23.

Secured to upper and lower portions of spaced links are die half supporting plates 25 mounted directly upon the pins coupling the links of the chains, as clearly illustrated.

Turning now to the drive between the pairs of chains, it will appear that gears 26 are mounted on the shafts 22 below the sprockets 12 so that, in the drive of one of the shafts 22, both chains will be simultaneously driven. One of the gears 26 is shown in partial section in FIG. 3A of the drawing and this gear has on its lower surface a ratchet portion 27 engaged by a spring actuated pawl 28, the showing of the spring being omitted, as such structures are well known in the art. The pawl 28 is mounted on a pin 29 supported in an arm 30 mounted on the shaft 22, or an extensoin 22' thereof, as clearly noted in FIG. 3A. The pin 29 or a reduced end 29' projects through the arm and mounted on 29' is an operating rod 31 actuated from suitably timed source to intermittently move the ratchet 27 one tooth or a distance sufficient to move the dies, later described, one increment in each cycle of operation of the machine. One of the teeth of the ratchet 27 is shown in section at 27' in FIG. 1 of the drawing.

Supported in connection with each of the plates 25 by studs 32 are die halves 33, both of the same general construction. Considering FIGS. 2, 4 and 6 of the drawing, each die half has, at one side, upper and lower tapered dowels 34 and at the opposed side corresponding tapered sockets 35 for reception of the dowels of the companion die part. The dowels 34 are sectioned in FIGS. 4 and 6 and would represent the dowels shown at the die at the left side of FIG. 2 of the drawing; whereas, the companion die has the dowels at 34' to engage 35 and sockets 35' to receive 34, as clearly illustrated in FIG. 2. As briefly pointed out before, the dowel pins and the representations of the sockets have been omitted from the illustration in FIG. 1 in order to avoid confusion in this illustration.

It will be understood that all of the die halves will be of similar construction which is shown in more detail in FIGS. 2, 4 and 6.

Each die half has similar spool cavities 36, which cavities are clearly illustrated in FIGS. 3, 4 and 6. Collectively, these cavities define the peripheral contour of a spool to be formed and are of more or less conventional shape. Each die half has a lower core print 37 and an upper short core print 38 opening into a conical recess 39, facilitating delivery of powdered or crystal foamable plastic 40 into the cavities 36 by means later described.

Considering FIG. 6 of the drawing, here is diagrammatically illustrated the core insertion station 14 for insertion of core pins 41 into position between the die halves 33 when in abutting arrangement with each other shortly after passing over the sprockets at the end 10 of the machine. A quantity of these core pins are supported in a magazine 42, as illustrated, in part, in FIG. 6, the pins feeding down a track 43 in the magazine into abutting engagement with a stop shelf 44. Periodically operated in the upper portion of the magazine 42 is a pusher pin or rod 45, having a rounded lower surface 46, as seen in section, to engage the rounded end of the pins 41, to push the pin adjacent the shelf 44 downwardly for feed through the core print 38 and into the core print 37, the conical recess 39 guiding the pin in this movement. Downward feed of the pin is checked by a stop rail and track 47, shown in section in FIGS. 4 and 6. The rail has an inclined surface 48 extending from the plastic loading station 15 to the core lift station 16, as diagrammatically seen in FIG. 4 of the drawing. In other words, initially, the core pin delivered into position between the dies leaves the core print 38 open for delivery of the powdered or crystal plastic 40 into the cavity 36 of the dies, as later described, after which, the pin is raised to close and seal the core print 38.

In the above described discharge of the core pins 41 from the magazine 42, a pawl 49 is actuated against a spring 50 supported in the magazine 42 to release one of the pins 41; whereupon, the spring returns the pawl to seated position on the shelf 51, retaining the next adjacent pin against displacement until discharged by the pusher 45. It will be noted that the magazine 42 is recessed, as seen at 52, to provide movement of the pawl 49 into position, clearing the ejected or discharged pin 41. At this time, it is pointed out that, when the core pins are ejected from the discharge end of the machine, as at the station 19, suitable means is provided, as diagrammatically illustrated by the arrow 21, for return of the pins to a hopper portion of the magazine 42, which is not shown, but such hoppers are well known in the art.

Considering FIG. 4 of the drawing, it will appear that, when a pair of dies are brought into position, registering with the plastic loading station 15, a measured quantity of plastics will be fed into the cavity 36 of the dies from a storage hopper shown, in part, at 53, having at its lower end an elongated delivery portion 54, in which is suitably actuated a slide 55 having an actuating rod 56 at one end. The slide has an elongated opening 57 therein and operating in this opening is an adjustable measuring element 58, having a head 59 operating in the elongated delivery portion 54 controlling the size of the aperture into which the powdered or crystal plastic is discharged from the hopper 53 when the slide is in the retracted position. The element 58 includes a tail portion 60 operating a recess 61 in the upper surface of the slide as the element is adjusted in the slide through the medium of an adjustment rod 62 in threaded engagement with the slide. The rod 62 has a head 63 keyed in the head 59 of the element, as shown, with a lock nut 64 retaining the rod in any desired adjusted position. The rod 62 includes a squared end 65 facilitating rotation thereof in adjusting position of the element 58.

Extending from the delivery portion 54 is a chute 66, into which the plastic is delivered by the slide for transmission into the die cavity, the completion of which is diagrammatically illustrated in FIG. 4.

The dies, after receiving the delivery of plastic, as seen at the left of FIG. 4, then move to the station 16, illustrated at the right of FIG. 4, where the pin 41 has been raised to seal the core print 38, after which, the dies, in this state, are intermittently fed through the heating or baking station 17 having suitable heating means, as at 67, preferably in the form of electric induction coils to heat the dies during the curing period of the expandable plastic employed in producing the desired density in the end product spool produced.

Continued operation of the machine moves the dies through the cooling station 18 to finally set or form the desired plastic spool and at 68 is diagrammatically illustrated cooling means at the cooling station 18. As previously mentioned, the length of the stations 17 and 18 will govern the speed at which the die supporting chains are operated and, consistent with this length, the length of the chains will be proportionately modified.

After passing the cooling station, the dies now register with the core ejector station 17, which is illustrated, in part, in FIG. 3 of the drawing and, at this station, an ejector rod 69 passes down through the dies and removes the core pin, as illustrated, in part, at 41' in said figure; whereupon, the dies then pass around the sprockets at the discharge end 11 of the machine, as illustrated, in part, in FIG. 1, permitting release of the finished end spool product 70 for suitable transmission into a receptacle of any type or kind. The finished spool product 70 is shown in section in FIG. 3, where plastic sectioning is shown, but it will be apparent that this showing is to represent a finished spool product fashioned from foamable plastic material.

In movement of the dies between the machine ends 10 and 11, the chains 13 pass over backup rails 71 which engage the rollers 24 of the chains and are grooved, as indicated at 71' in FIG. 1, to receive the link portions of the chain. These backup rails are so positioned and maintained as to support adjacent surfaces of the die halves 33 in firm abutting engagement with each other and this pressure is released just prior to the dies entering the core ejector station 19, as will be apparent from a consideration of FIG. 1 of the drawing.

It is pointed out at this time from a standpoint of economy in the production of a machine of the type and kind under consideration that the die halves 33 will preferably be made by the powder metallurgy process and steel or beryllium copper can be used for this purpose. Otherwise, the machine comprises the two pairs of wide or multiple linked chains, with two drive sprockets at the discharge end 11 and two idler sprockets at the delivery end 10 of the machine, the one driving medium employed actuating the two drive sprockets through the intermeshing gears, as at 26.

In FIG. 8 of the drawing, I have illustrated schematically the basis of a machine where two or more simultaneous operations at the stations 14, 15, 16 and 19 can be performed. By way of illustration, five of such operations are indicated, for example, at the plastic loading station. In FIG. 8, five of such stations 15 are designated by the reference characters 15' and at 39' are shown the conical recesses, into which the plastic material is discharged through the means employed, as illustrated in FIG. 4, and these simultaneous deliveries of plastic to 39' are indicated by the arrows 72 in FIG. 8. In this figure, two only of the pairs of dies are outlined at 73, it being understood that dies will be located at the other three stations shown at the upper portion of FIG. 8. There appears to be no need to duplicate this showing for a clear illustration of the operation. With this type of construction, the increment feed of the chains will be equivalent to the distance traveled by the five groups of dies. In other words, at the core inserting station 14, five pins, as at 41, will be inserted into each of the five dies, five injections of plastic material will take place at the station 15, the five core pins will be lifted or raised at the station 16 and the five core pins will be ejected at the station 19.

It will also be understood that, whenever it is desired to produce end spool products of different sizes or contours, new dies can be substituted by simply removing the studs 32. When it is desirable to produce plastic spools of a different colored plastic and/or in employing pairs of dies having different size or contour of spools at suitable spaced intervals on the chains 13, all that would be necessary would be to produce a pair of the plastic delivery units at the station 15 periodically or timely brought into registering position, with the dies then located at the station 15 to discharge different colored plastics or different quantities of plastics into the die cavity. This end result can be accomplished by well known means for intermittent operation of the two members provided at the loading station 15 and timed with the complete cycle of rotation of the chains. To give a few examples, every other complete die could form a molded end product of a different characteristic, either in color or size, or one successive series of dies could produce end products of one characteristic and the next series of dies on the chain could produce end products having different characteristics.

Having fully described my invention, what I claim as new and desire to secure by Letters Patent is:

1. A machine for producing foamed plastic spools, comprising a pair of endless chains, spaced means for intermittently driving said pair of chains with portions of the chains in each pair disposed in adjacent parallel relationship to each other, die halves on the chain of each projecting pair from the outer surface of the chain so as to bring die halves of the two chains into abutting engagement with each other to form a die cavity, ends of the chains being defined by pairs of sprockets, one pair at a delivery end of the machine and the other at the discharge end of the machine, around which the chains pass, a plurality of stations spaced along the path of movement of the dies by said chains between said delivery and discharge ends, one station comprising a core pin inserting station at the delivery end of the machine having means for inserting a core pin axially into each die cavity registering with said station so that said core pin passes only partially through said die cavity to leave an axial filler opening at one end of said cavity, a plastic loading station adjacent said first named station for introducing through said filler opening a premeasured quantity of plastic into said die cavity, a core lifting station adjacent said loading station for raising the core pin into a sealed position in the die when registering with said lifting station, successive heating and cooling stations extending longitudinally of the chains between said core lifting station and a core ejector station, means at the core ejector station for removing the core from the formed spool delivered to said ejector station, said formed spool being ejected from the machine adjacent the sprockets at the discharge end of the machine, and means supporting die halves of respective chains in firm engagment with each other in passage through the heating and cooling stations.

2. A machine as defined in claim 1, wherein the core inserting station includes a magazine for storage of a multiplicity of core pins, means for supporting the pins against accidental displacement from said magazine, and means for discharging core pins one at a time against the action of said last named means for delivery to a pair of dies positioned at said insert station.

3. A machine as defined in claim 2, having means to return to the magazine at the core inserting station the core pin removed at the ejector station.

4. A machine of the character defined comprising means for supporting a plurality of pairs of dies in abutting engagement with each other from a delivery end of the machine to a discharge end thereof, means for intermittently moving each pair of dies in registration with predetermined stations spaced longitudinally of the path of movement of the dies when in abutting engagement with each other, each pair of dies collectively forming a cavity for molding a predetermined member, means at one station for inserting a core pin into a predetermined position in the cavity of each die as positioned at said station, means for then inserting uncured foamable plastic into the cavity of each pair of dies at a loading station adjacent said first station, a core pin lifting station adjacent said loading station with means for raising the core pin into sealed position into the cavity of the die positioned at said station, heating and cooling stations spaced successively and longitudinally of the dies as fed from the delivery end to the discharge end of the machine, means supporting the die halves in firm engagement with each other in passing through said heating and cooling stations, a core ejector station adjacent the discharge end of the machine for ejecting a core pin from a pair of dies positioned at said station and the end product delivered to the ejector station from said cooling station, and said end product being discharged into a suitable receptacle in separation of the die halves at the discharge end of the machine.

5. A machine as defined in claim 4, having means wherein the core pin ejected at the ejector station is returned to the core insert station for reuse as an insertable core at the insert station.

References Cited by the Examiner
UNITED STATES PATENTS

| | | | |
|---|---|---|---|
| 1,291,400 | 1/1919 | Casella | 18—5 |
| 1,313,558 | 8/1919 | Sargent | 18—26 X |
| 1,321,830 | 11/1919 | Kipniss et al. | 18—5 |
| 2,916,765 | 12/1959 | Heller | 18—4 |
| 2,948,019 | 8/1960 | Peterson | 18—4 X |
| 2,958,095 | 11/1960 | Ahlefeld | 18—4 |
| 2,974,361 | 3/1961 | Gercke et al. | 18—4 |
| 3,135,993 | 6/1964 | Ryan | 18—4 X |

WILLIAM J. STEPHENSON, *Primary Examiner.*